US011930561B2

(12) United States Patent
Potter

(10) Patent No.: US 11,930,561 B2
(45) Date of Patent: Mar. 12, 2024

(54) AEROSOL PROVISION DEVICE

(71) Applicant: NICOVENTURES TRADING LIMITED, London (GB)

(72) Inventor: Mark Potter, London (GB)

(73) Assignee: NICOVENTURES TRADING LIMITED, London (GB)

( * ) Notice: Subject to any disclaimer, the term of this patent is extended or adjusted under 35 U.S.C. 154(b) by 222 days.

(21) Appl. No.: 15/733,297

(22) PCT Filed: Dec. 21, 2018

(86) PCT No.: PCT/EP2018/086621
§ 371 (c)(1),
(2) Date: Jun. 22, 2020

(87) PCT Pub. No.: WO2019/122344
PCT Pub. Date: Jun. 27, 2019

(65) Prior Publication Data
US 2021/0093013 A1 Apr. 1, 2021

(30) Foreign Application Priority Data
Dec. 21, 2017 (GB) ..................................... 1721646

(51) Int. Cl.
*H05B 1/02* (2006.01)
*A24F 40/53* (2020.01)
(Continued)

(52) U.S. Cl.
CPC ........... *H05B 1/0227* (2013.01); *A24F 40/53* (2020.01); *A24F 40/57* (2020.01); *H05B 1/0244* (2013.01);
(Continued)

(58) Field of Classification Search
CPC ..... H05B 1/0227; H05B 1/0244; A24F 40/53; A24F 40/57; A24F 40/10
(Continued)

(56) References Cited

U.S. PATENT DOCUMENTS 10,099,916 B2 * 10/2018 Murison ............... F04B 43/046
10,165,799 B2 * 1/2019 Reevell .................. A24F 40/50
(Continued)

FOREIGN PATENT DOCUMENTS

JP 2000041654 A 2/2000
JP 2005202832 A 7/2005
(Continued)

OTHER PUBLICATIONS

International Preliminary Report on Patentability received for PCT Patent Application No. PCT/EP2018/086621, dated Jul. 2, 2020, 9 pages.
(Continued)

*Primary Examiner* — Alexander Gilman
(74) *Attorney, Agent, or Firm* — Husch Blackwell LLP

(57) ABSTRACT

An aerosol provision device includes a power source, at least one heating element for generating aerosol, and temperature monitoring means configured to monitor the temperature of the heating element. In an operational configuration the device is configured to control the supply of power to the heating element to: supply power to the heating element to initially raise the temperature of the heating element to a first threshold temperature; remove power supplied to the heating element when the temperature monitoring means detects that the temperature of the heating element is at the first threshold temperature, such that the temperature of the heating element decreases to a second threshold temperature; supply power to the heating element when the temperature monitoring means detects that the temperature of the heating
(Continued)

element has reduced to the second threshold temperature, such that the temperature of the heating element increases towards the first threshold temperature.

6 Claims, 4 Drawing Sheets

(51) Int. Cl.
*A24F 40/57* (2020.01)
*A24F 40/10* (2020.01)

(52) U.S. Cl.
CPC ........ *A24F 40/10* (2020.01); *H05B 2203/021* (2013.01)

(58) Field of Classification Search
USPC .......................................................... 131/328
See application file for complete search history.

(56) References Cited

U.S. PATENT DOCUMENTS

| | | | | |
|---|---|---|---|---|
| 11,013,262 | B2* | 5/2021 | Reevell | H05B 1/0244 |
| 2013/0319435 | A1* | 12/2013 | Flick | A61M 11/041 219/490 |
| 2014/0020693 | A1* | 1/2014 | Cochand | A61M 11/041 131/273 |
| 2014/0299141 | A1* | 10/2014 | Flick | H05B 1/0202 219/494 |
| 2014/0338685 | A1* | 11/2014 | Amir | H05B 1/0244 131/329 |
| 2015/0122274 | A1* | 5/2015 | Cohen | A24F 40/40 131/328 |
| 2015/0230521 | A1* | 8/2015 | Talon | A24F 40/50 131/328 |
| 2015/0237916 | A1* | 8/2015 | Farine | A24F 40/53 219/492 |
| 2016/0360786 | A1* | 12/2016 | Bellinger | A24F 40/46 |
| 2017/0055585 | A1* | 3/2017 | Fursa | H05B 6/105 |
| 2017/0055587 | A1* | 3/2017 | Zinovik | H05B 6/108 |
| 2017/0135406 | A1* | 5/2017 | Reevell | H05B 3/04 |
| 2017/0196273 | A1* | 7/2017 | Qiu | A24F 40/44 |
| 2017/0224019 | A1* | 8/2017 | Kuczaj | H05B 3/0014 |
| 2017/0280779 | A1* | 10/2017 | Qiu | G05D 23/2401 |
| 2017/0325507 | A1* | 11/2017 | Xiang | F22B 1/284 |
| 2018/0042306 | A1* | 2/2018 | Atkins | A24F 40/50 |
| 2018/0132528 | A1* | 5/2018 | Sur | A24F 40/60 |
| 2018/0220708 | A1* | 8/2018 | Scott | H05B 1/0297 |
| 2018/0235282 | A1* | 8/2018 | Gao | A24F 40/53 |
| 2019/0090545 | A1* | 3/2019 | Reevell | A24F 40/50 |
| 2019/0142067 | A1* | 5/2019 | Martzel | A24F 40/53 131/329 |
| 2021/0243844 | A1* | 8/2021 | Reevell | H05B 3/44 |

FOREIGN PATENT DOCUMENTS

| | | | |
|---|---|---|---|
| JP | 2013164901 | A | 8/2013 |
| JP | 2014530632 | A | 11/2014 |
| JP | 2015531600 | A | 11/2015 |
| JP | 2017523785 | A | 8/2017 |
| RU | 72821 | U1 | 5/2008 |
| RU | 2613785 | C2 | 3/2017 |
| WO | 2013060781 | A1 | 5/2013 |
| WO | WO-2013168734 | A1 | 11/2013 |
| WO | WO-2017057286 | A1 | 4/2017 |
| WO | 2017191143 | A2 | 11/2017 |

OTHER PUBLICATIONS

International Search Report and Written Opinion received for PCT Patent Application No. PCT/EP2018/086621, dated May 7, 2019, 13 pages.
Office Action For Canadian Application No. 3,086,013, dated Apr. 6, 2022, 5 pages.
Office Action For Canadian Application No. 3,086,013, dated Sep. 23, 2021, 6 pages.
Office Action For Japanese Application No. 2020-531922, dated Aug. 31, 2021, 6 pages.
Office Action For Japanese Application No. 2020-531922, dated Jun. 7, 2022, 7 pages.
Office Action for Korean Application No. 10-2020-7017877, dated Feb. 10, 2022, 16 pages.
Office Action dated Nov. 24, 2020 for Russian Application No. 2020120487, 8 pages.

* cited by examiner

AEROSOL PROVISION DEVICE

PRIORITY CLAIM

The present application is a National Phase entry of PCT Application No. PCT/EP2018/086621, filed Dec. 21, 2018, which claims priority from GB Patent Application No. 1721646.6, filed Dec. 21, 2017, each of which is hereby fully incorporated herein by reference.

TECHNICAL FIELD

The present disclosure relates to an aerosol provision device for generating an inhalable medium.

BACKGROUND

Smoking articles such as cigarettes, cigars and the like burn tobacco during use to create tobacco smoke.

Attempts have been made to provide alternatives to these articles that burn tobacco by creating products that generate an inhalable medium without burning.

Examples of such products are so-called e-cigarette devices. These devices contain an aerosolizable substance, typically a liquid, which is heated to be vaporized to produce an inhalable vapor or aerosol. The liquid may contain nicotine and/or flavorings and/or aerosol-generating substances, such as glycerol. Such known e-cigarette devices typically do not contain or use tobacco.

SUMMARY

According to a first aspect of the present disclosure, there is provided an aerosol provision device comprising: a power source, at least one heating element for generating aerosol, and temperature monitoring means configured to monitor the temperature of the heating element, wherein when in an operational configuration the device is configured to control the supply of power to the heating element to: supply power to the heating element to initially raise the temperature of the heating element to a first threshold temperature; remove power supplied to the heating element when the temperature monitoring means detects that the temperature of the heating element is at the first threshold temperature, such that the temperature of the heating element decreases to a second threshold temperature; supply power to the heating element when the temperature monitoring means detects that the temperature of the heating element has reduced to the second threshold temperature, such that the temperature of the heating element increases towards the first threshold temperature.

The heating element may be a coil. The aerosol provision device may further comprise a puff detector and the device may be configured in the operational configuration or in a non-operational configuration based on input from the puff detector.

The device may be configured to repeat one of more parts of a method according to an aspect of the disclosure such that once the temperature of the heating element has reached the first threshold temperature the temperature of the heating element remains above or at the second threshold temperature and lower than or equal to the first threshold temperature.

According to a second aspect of the disclosure a method of powering a heating element for an aerosol generating device is provided, wherein the method comprises: monitoring a temperature of the heating element; initially supplying power to the heating element to raise the temperature of the heating element to a first threshold temperature; removing power supplied to the heating element when the temperature of the heating element reaches the first threshold temperature, such that the temperature of the heating element decreases to a second threshold temperature; increasing the power supplied to the heating element when the temperature of the heating element reaches the second threshold temperature, such that the temperature of the heating element increases towards the first threshold temperature.

The method may comprise initially supplying power to the heater when it is detected by a puff detector that a user is drawing on the device.

The method may further comprise repeating one or more parts according to the second aspect such that once the temperature of the heating element has reached the first threshold temperature the temperature of the heating element remains above or at the second threshold temperature and lower than or equal to the first threshold temperature.

DETAILED DESCRIPTION

Figure 1:
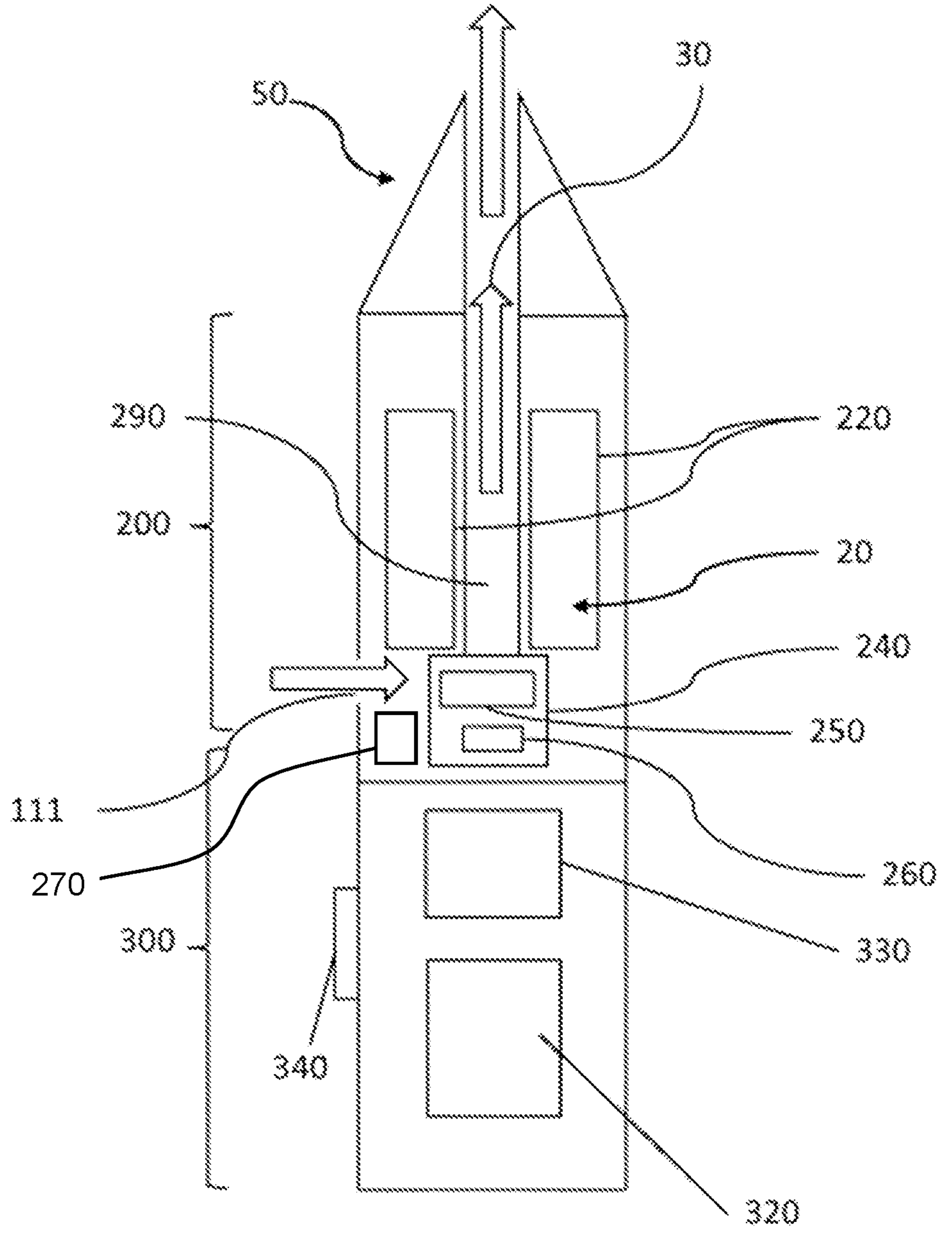
FIG. 1 shows a schematic longitudinal representation of an example of an aerosol provision device.

With reference to FIG. 1, an example aerosol provision device 100 is shown. The aerosol provision device 100 is an inhalation device (i.e. a user uses it to inhale an aerosol provided by the device 100) and the device 100 is a hand-held device. The device 100 is an electronic device.

In broad outline, the device 100 volatilizes an aerosol-generating material 20 to produce a vapor or aerosol for inhalation by a user. In this example the aerosol-generating material 20 is a liquid, for example, an e-cigarette liquid; however, in other examples the aerosol-generating material may be another type of aerosolizable substance, such as a gel.

In some examples, the device may be a hybrid device in which aerosol generated passes through an additional substance before being inhaled by the user. In some examples where the device is a hybrid device, the additional substance may comprise a flavor element. The additional substance may impart to or modify a property of aerosol passing through the substance. The additional substance may, for example, comprise or consist of tobacco. Where the additional substance comprises tobacco, the aerosol may entrain organic compounds and/or other compounds or constituents from the substance to impart flavor or otherwise modify a property of the aerosol.

In at least some examples a vapor is produced that then at least partly condenses to form an aerosol before exiting the aerosol provision device 100.

In this respect, first it may be noted that, in general, a vapor is a substance in the gas phase at a temperature lower than its critical temperature, which means that for example the vapor can be condensed to a liquid by increasing its pressure without reducing the temperature. On the other hand, in general, an aerosol is a colloid of fine solid particles or liquid droplets, in air or another gas. A "colloid" is a substance in which microscopically dispersed insoluble particles are suspended throughout another substance.

For reasons of convenience, as used herein the term aerosol should be taken as meaning an aerosol, a vapor or a combination of an aerosol and vapor.

Returning to FIG. 1, the device 100 of this example comprises a body portion 300, a cartridge 200 and a mouthpiece 50. In some examples, the cartridge 200 may be detachable from the body portion 300 while in other examples, the cartridge 200 may not be detachable from the device 100, or the device 100 may not comprise a cartridge 200 any instead comprise a section for containing an aerosolizable substance in another part of the device, for example in the body portion 300.

The cartridge 200 is for containing aerosol-generating material 20, which in this case is a liquid 20 but which may be another type of aerosolizable substance, while the body portion 300 is for powering and controlling the device 100. The device 100 further comprises heating means 240 for heating the aerosol-generating material (in the example of FIG. 1, liquid 20) to produce an aerosol flow 30 for inhalation by a user.

The cartridge 200 comprises a reservoir 220 for containing the liquid 20. The reservoir 220 may be an annular chamber surrounding a central aperture 290 through which generated aerosol flows out of a mouthpiece 50 for inhalation by a user. In the example of FIG. 1 the heating means 240 for aerosolizing the liquid 20 is located in the cartridge 200 though in some examples, the heating means 240 may be separate from the cartridge 200. In some examples, the heating means 240 may be located in the body portion 300 of the device 100. In some examples, the heating means 240 may be separately removable from the device 100, for example for removing and replacing when it is desired to replace the heating means 240. In this example, the heating means 240 comprises at least one heating element 250 and at least one wick (not shown) for supplying liquid 20 to the at least one heating element 250 from the liquid reservoir 220.

The heating arrangement 240 may in some examples be referred to as an 'atomizer', while a liquid cartridge, such as the cartridge 200, comprising an 'atomizer' may be referred to as a 'cartomizer'.

The body portion 300 of the device 100 comprises a power source 320 which is electrically connected to various components of the device 100, including the heating means 240, to supply said components with electrical power. The power source 320 may be a battery, such as a rechargeable battery or a disposable battery and is sometimes referred to herein as battery 320.

A controller 330, which may comprise a micro-chip and associated circuitry, is also provided in the body portion 300 for controlling the operation of various components of the device 100, including supply of power to the heating means 240, as will be discussed in further detail below. A user input means 340, for example one or more control buttons, may be provided on the exterior of the second housing 310 for a user to operate the controller 330.

The liquid 20 can be a liquid that is volatilizable at reasonable temperatures, such as in the range of 100-300° C. or more particularly around 150-250° C., as that helps to keep down the power consumption of the system 100. Suitable materials include those conventionally used in e-cigarette devices, including for example propylene glycol and glycerol (also known as glycerine). In some examples, the aerosol-generating material contains nicotine while in others the aerosol-generating material does not contain nicotine. The aerosol-generating material may in some examples contain a flavoring.

Accordingly, in use, a user draws on the mouthpiece 50, and air is drawn through one or more air inlets 111. The device 100, including heating means 240, may be configured in an operational configuration by the user operating the control button 340. In some examples, input from a puff detector 270, as is known per se, may be used to determine whether the device 100 is place in an operational configuration. In operation, liquid 20 is drawn from the liquid reservoir 220 via the at least one wick and the liquid 20 is volatilized by the heating means 240 by heating to generate aerosol. The generated aerosol mixes with air flowing from the air inlet 111 to produce the flow of aerosol 30.

The heating element 250 may be a resistive heating element and may be, for example a linear heating element or a coil. In some examples described herein, the at least one heating element 250 is a heating coil 250. In some examples, the heating means 240 may comprise more than one heating element and in such examples each heating element may be a heating coil. The device 100 comprises a temperature monitoring means 260 for monitoring the temperature of the heating element 250. The temperature monitoring means 260 may comprise any suitable temperature sensing means, for example, an electrical thermometer or means for measuring the resistivity of the heating element 250.

The controller 330 monitors the temperature of the heating element 250 via temperature monitoring means 260 and monitors the control means 340 and/or a puff detector 270 to determine whether to configure the device 100 in an operational configuration. In some examples, the controller 330 receives input from control means 340 or from the puff detector 270 indicating that a user has actuated the device 100. The controller 330 then acts to supply power to the heating element 250 to raise its temperature to an operational temperature for generating aerosol, as measured by the temperature control means 260.

Figure 2:
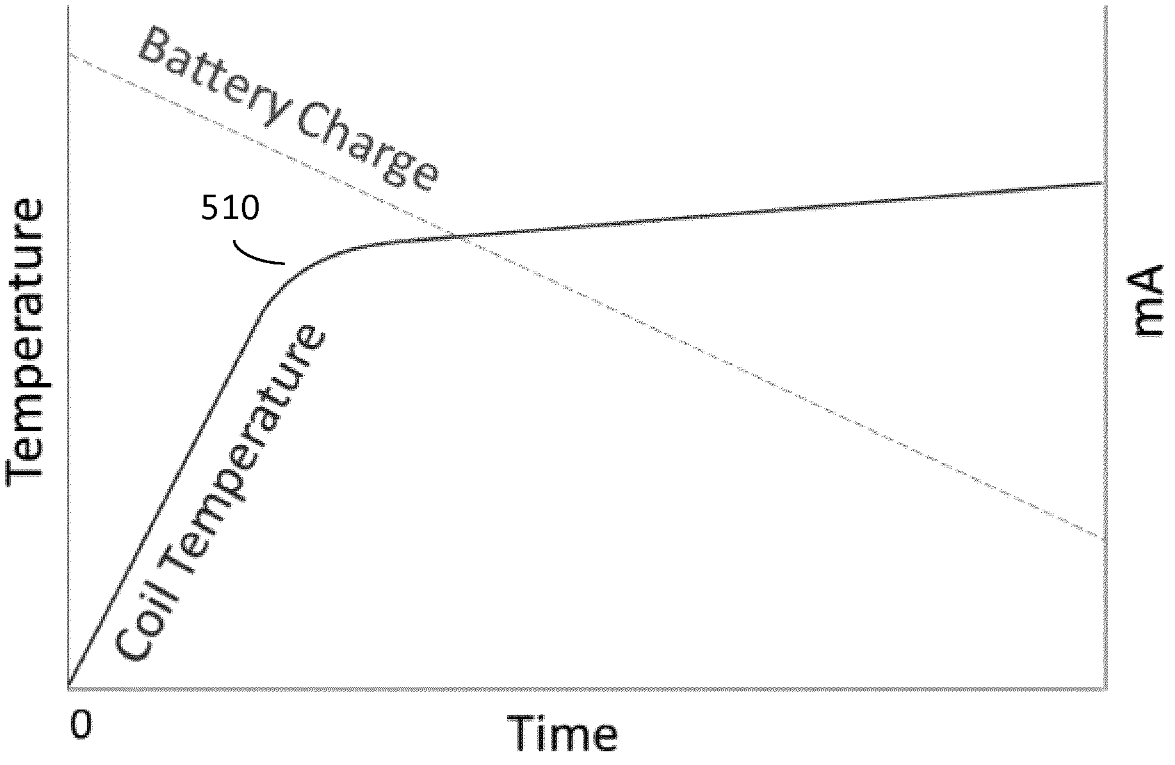
Figure 2 (Prior art)
FIG. 2 shows an example schematic graphical representation of coil temperature and battery charge against time in an example of a prior art aerosol provision device.

FIG. 2 shows a schematic representation of the temperature profile of a heating element, a heating coil, in a prior art arrangement. In such examples, when actuation of the device 100 is detected (at time 0), for example by puff detector 270 or by user control means 340, the device 100 is configured to supply power to the heating coil 250 to raise its temperature from a starting temperature to an operational temperature 510. The operational temperature 510 may be a temperature which is suitable for the coil 250 to produce aerosol. In this prior art arrangement, the device 100 continuously supplies power to the coil 250 such that the temperature of the coil 250 continues to increase after reaching operational temperature, and the temperature may continue to increase while the device 100 remains operational, for example while the puff detector 270 continues to detect that the user is puffing on the device 100. FIG. 2 shows schematically how, in this prior art arrangement, since power is being continuously supplied to the heating coil 250 the energy supplied from the power source 320 continues to increase over the time the device 100 is operated. This is shown in FIG. 2 as a charge level of the battery 320 which depletes continuously over the time that the device 100 is operated.

Figure 3:
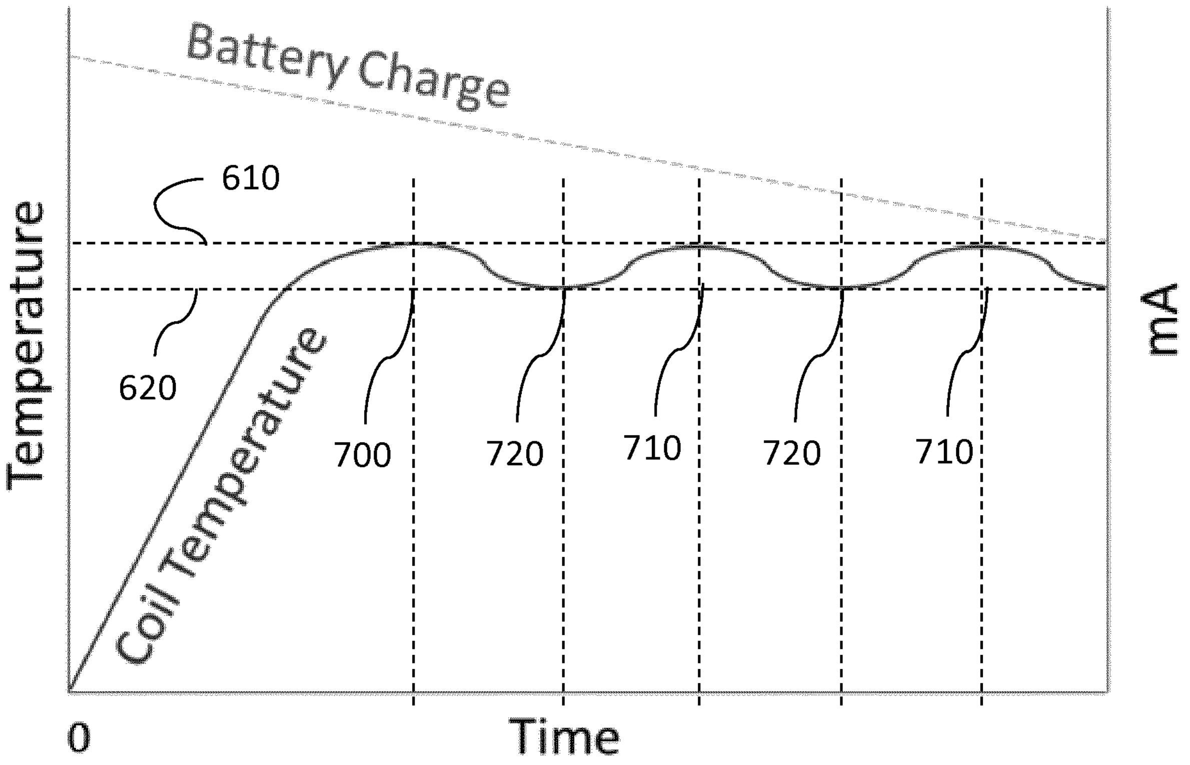
FIG. 3 shows a schematic graphical representation of coil temperature and battery charge against time in an example aerosol provision device.

FIG. 3 shows a schematic representation of the temperature profile of the heating coil 250 according to the present disclosure. In this example, the controller 330 is configured to provide power to the heating means 250, in this example heating coil 250, to raise the temperature of the heating coil 250 from a starting temperature (at time 0) to a first threshold temperature 610. The controller 330 is configured to detect actuation of the device 100 by a user, such as through user control means 340, or in some examples through detecting a user attempting to inhale from the device via the puff detector 270.

When actuation of the device 100 is detected (at time 0) the controller 330 is configured to supply power to the heating coil 250 to raise the temperature of the coil 250 to aerosolize the liquid 20. The controller 330 is configured to supply power to raise the temperature of the heating coil 250 to a first threshold temperature 610.

The controller 330 is configured to monitor the temperature of the coil 250 via the temperature monitoring means 260, and when the controller detects that the temperature of the coil 250 is at the first threshold temperature 610 (at 700 in FIG. 3), the controller 330 is configured to remove the power supplied to the coil 250. This removal of power when the temperature of the coil 250 reaches the first threshold temperature 610 in this example allows the coil temperature to reduce to a second threshold temperature 620.

It is to be noted that in some examples the device 100 may begin to produce aerosol at 700 when the coil reaches the first threshold temperature 610. However, the device 100 may produce aerosol before the coil temperature reaches the first threshold temperature 610. In some examples, the second threshold temperature 620 may be the minimum temperature which is suitable for the coil 250 to produce aerosol, or in other examples, the second threshold temperature 620 may be different to this minimum temperature. For example, the second threshold temperature 620 may be higher than the minimum temperature which is suitable for producing aerosol.

In this example, between 700 and 720, the device 100 remains in operation and the temperature of the coil 250 is allowed to reduce (due to the power supplied to the coil 250 being removed) while the coil 250 aerosolizes liquid 20. When the measured coil temperature reaches the second threshold temperature 620 (at 720), the controller 330 resumes supplying power to the coil 250. This resumption of power acts to increase the temperature of the coil 250 from the second threshold temperature 620 to the first threshold temperature 610.

When the temperature of the coil 250 increases to, again, reach the first threshold temperature 610 (at 720), power is, again, removed from the coil and the temperature of the coil 250 is again allowed to reduce towards the second threshold temperature 620. The cycle of supplying power to and removing power from the coil may be repeated to allow the coil temperature to vary between the first threshold temperature 610 and the second threshold temperature 620 while the device 100 remains in operation, for example while the puff detector 270 detects that a user is puffing on the device 100, or in other examples while the user continues to actuate the device 100 via the control means 340. Since power is not continuously supplied in the example of FIG. 3, energy from the power source 320 may be used at a lower average rate over the usage session and the charge of battery 320 depletes at a lower rate than in the example arrangements, such as that shown in FIG. 2, where power is continuously supplied to the heating coil 250.

Figure 4:
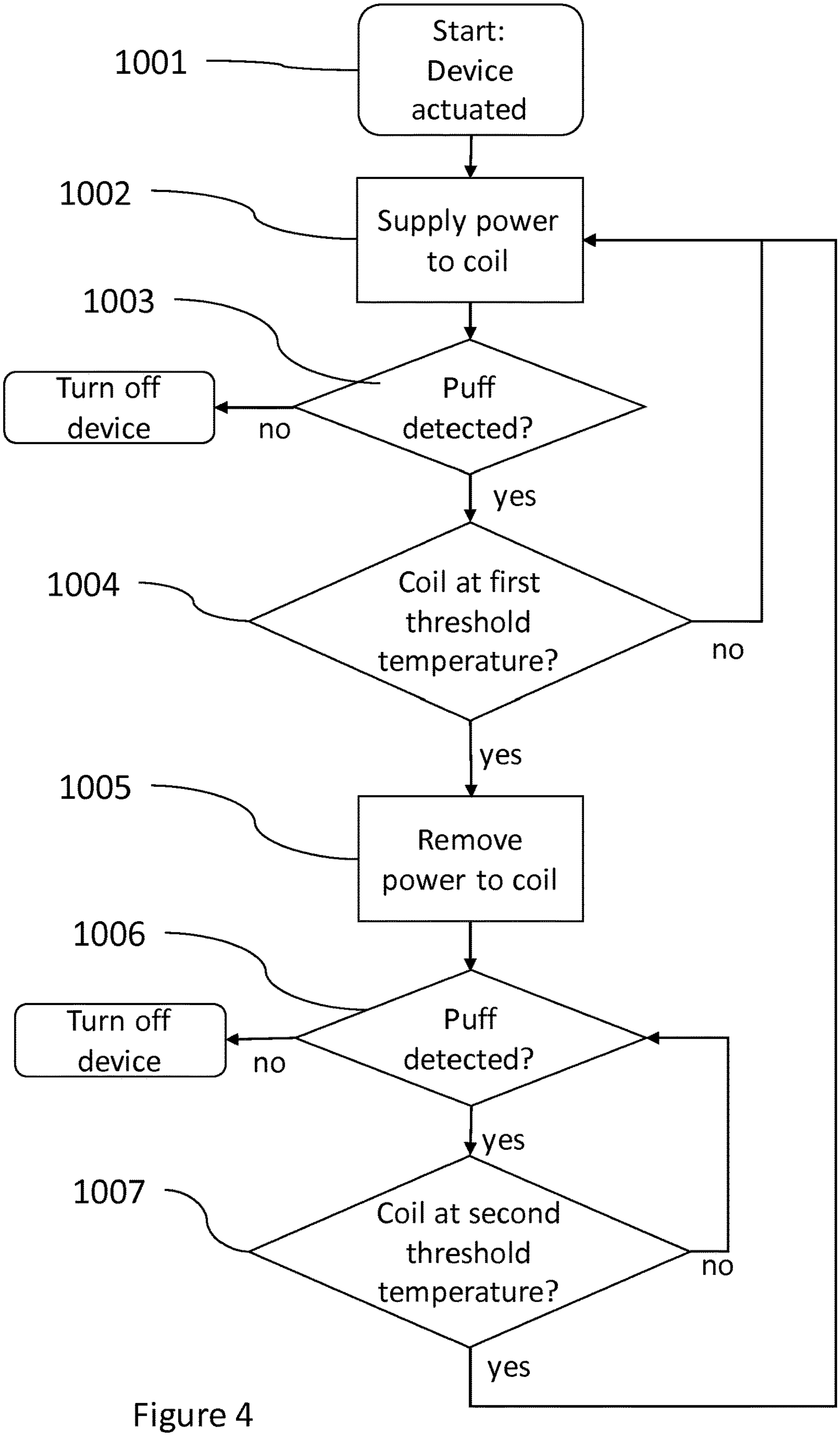
FIG. 4 shows a schematic flow chart representation of an example method of operating an aerosol provision device according to one aspect of the present invention.

FIG. 4 shows a flow diagram representation of an example method of operating the device 100. The device 100 is actuated at 1001 (at a time corresponding to time 0 shown in FIG. 3) and at 1002 power is supplied to the coil 250 to increase the temperature of the coil 250. At 1003 the device 100 monitors the puff detector 270 and maintains the device 100 in an operational configuration if a puff is detected. If no puff is detected at 1003, the device 100 is switched off. At 1004 the controller 330 checks whether the coil 250 is at the first threshold temperature 610. If at 1004 the controller 330 detects that the coil 250 is at the first threshold temperature 610 the controller 330 removes the supply of power to the coil 250 (at 1005) and the coil temperature is allowed to reduce from the first threshold temperature 610 towards the second threshold temperature 620 (while continuing to produce aerosol). At 1006 the controller 330 again checks the puff detector 270 and continues to operate if a puff is detected. If no puff is detected at 1006, the device 100 is switched off. At 1007 the controller 330 checks whether the coil 250 is at the second threshold temperature 620, and if it detects that the coil 250 is at the second threshold temperature 620, it resumes supplying power to the coil 250, and the method continues from 1002.

It is to be noted that in some examples, the method may comprise checking that the device 100 is in use less frequently than described with reference to FIG. 4, for example, only at 1003 or only at 1006. As mentioned above, in some examples, the device 100 may not comprise a puff detector 270 and may instead use user control means 340 to detect whether the device 100 is in use.

In the example arrangements according to the invention described herein, and shown in FIG. 3 and FIG. 4, the coil 250 periodically does not receive power from the battery 320. Therefore, the average power level supplied to the coil 250 while the device 100 is operational is lower than the average power level supplied to the coil in the prior art arrangement shown by FIG. 2. As such, the battery charge level may deplete more slowly and battery life may be extended by use of the described arrangements. Additionally, the temperature of the heating coil 250 is kept within a defined range (between the second threshold temperature 620 and the first threshold temperature 610), which may, for example: provide a more suitable temperature for volatizing the liquid 20 and/or provide for improved safety of the device 100. Power delivery to the heating element 250 may be said to be 'pulsed' in the operation of the device 100 according to the invention.

It is to be noted that where power is supplied to the heating element 250 in the examples described herein, the power supplied may not be of a constant value over the time that it is supplied i.e. between 700 and 720 and between 720 and 710. For example, in some examples, a protection circuit module (PCM) may be utilized, and power delivered to the heating element 250 between 700 and 720 and between 720 and 710 may comprise a pulsed delivery of power.

The invention claimed is:

1. An aerosol provision device comprising:

a power source;

at least one heating element for generating aerosol;

temperature monitoring means configured to monitor a temperature of the heating element; and a puff detector, wherein when in an operational configuration the aerosol provision device is configured to control the supply of power to the at least one heating element to:

supply power to the heating element to initially raise the temperature of the heating element to a first threshold temperature, remove power supplied to the heating element when the temperature monitoring means detects that the temperature of the heating element is at the first threshold temperature, such that the temperature of the heating element decreases to a second threshold temperature, and supply power to the heating element when the temperature monitoring means detects that the temperature of the heating element has reduced to the second threshold temperature, such that the temperature of the heating element increases towards the first threshold temperature;

and wherein the aerosol provision device is configured in the operational configuration or in a non-operational configuration based on input from the puff detector when initially raising the temperature of the heating element, and when the temperature monitoring means detects that the temperature of the heating element has reduced to the second threshold temperature.

2. The aerosol provision device according to claim 1, wherein the heating element is a coil.

3. The aerosol provision device according to claim 1, wherein the aerosol provision device is configured to repeat one or more of the supplying power to the heating element to initially raise the temperature of the heating element to a first threshold temperature, the removing power supplied to the heating element when the temperature monitoring means detects that the temperature of the heating element is at the first threshold temperature, or the supplying power to the heating element when the temperature monitoring means detects that the temperature of the heating element has reduced to the second threshold temperature such that once the temperature of the heating element has reached the first threshold temperature the temperature of the heating element remains above or at the second threshold temperature and lower than or equal to the first threshold temperature.

4. A method of powering a heating element for an aerosol generating device, the method comprising:

monitoring a temperature of the heating element;

initially supplying power to the heating element to raise the temperature of the heating element to a first threshold temperature;

removing power supplied to the heating element when the temperature of the heating element reaches the first threshold temperature, such that the temperature of the heating element decreases to a second threshold temperature; and increasing the power supplied to the heating element when the temperature of the heating element reaches the second threshold temperature, such that the temperature of the heating element increases towards the first threshold temperature;

wherein the aerosol generating device is configured in the operational configuration or in a non-operational configuration based on input from a puff detector when it is detected by the puff detector that a user is drawing on the device when initially raising the temperature of the heating element, and when the temperature monitoring means detects that the temperature of the heating element has reduced to the second threshold temperature.

5. The method according to claim 4, further comprising initially supplying power to the heater when a puff detector detects that a user is drawing on the aerosol generating device.

6. The method according to claim 4, further comprising repeating one or more of the monitoring, the initially supplying power, the removing power, or the increasing the power supplied to the heating element such that once the temperature of the heating element has reached the first threshold temperature the temperature of the heating element remains above or at the second threshold temperature and lower than or equal to the first threshold temperature.

* * * * *